(12) United States Patent
Kitamura et al.

(10) Patent No.: US 6,708,512 B2
(45) Date of Patent: Mar. 23, 2004

(54) VEHICLE AIR CONDITIONER WITH COLD ACCUMULATOR

(75) Inventors: Keiichi Kitamura, Kariya (JP); Yuichi Shirota, Kariya (JP); Koji Takahashi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/241,884

(22) Filed: Sep. 12, 2002

(65) Prior Publication Data

US 2003/0046944 A1 Mar. 13, 2003

(30) Foreign Application Priority Data

Sep. 13, 2001 (JP) ........................................ 2001-278329

(51) Int. Cl.[7] .............................. F25B 1/00; F25O 11/02
(52) U.S. Cl. ............................ 62/227; 62/437; 62/244
(58) Field of Search ............................ 62/227, 437, 239, 62/244, 430; 165/202

(56) References Cited

U.S. PATENT DOCUMENTS 5,085,790 A * 2/1992 Hormansdorfer ............ 252/70
5,901,572 A * 5/1999 Peiffer et al. .................. 62/480

FOREIGN PATENT DOCUMENTS

| JP | 10129244 A | * | 5/1998 | ............ B60H/1/32 |
| JP | 2000185545 A | * | 7/2000 | ............ B60H/1/22 |
| JP | 2001030749 A | * | 2/2001 | ............ B60H/1/32 |

* cited by examiner

*Primary Examiner*—Chen Wen Jiang
(74) *Attorney, Agent, or Firm*—Harness, Dickey & Pierce, PLC

(57) ABSTRACT

In a vehicle air conditioner, a cold accumulator is disposed at a downstream air side of an evaporator to be cooled by cold air after passing through the evaporator. A cold accumulating material is sealed within the cold accumulator to be solidified while being cooled by the cold air from the evaporator. The cold accumulating material is a mixture of plural kinds of paraffin materials having different melting points, equal to or more than two. The plural kinds of the paraffin materials are mixed, so that the cold accumulating material having a melting point in a range of 7–11° C. can be obtained. In this case, cooling function in the cold accumulator can be improved.

9 Claims, 3 Drawing Sheets

| PARAFFIN MATERIAL | | MELTING POINT (°C) | MELTING LATENT HEAT (kJ/kg) |
|---|---|---|---|
| n-DODECANE | C12H26 | -9.6 | 210 |
| n-TETRADECANE | C14H30 | 5.9 | 229 |
| n-HEXADECANE | C16H34 | 18.2 | 229 |
| n-OCTADECANE | C18H38 | 28.2 | 243 |

VEHICLE AIR CONDITIONER WITH COLD ACCUMULATOR

CROSS REFERENCE TO RELATED APPLICATION

This application is based on Japanese Patent Application No. 2001-278329 filed on Sep. 13, 2001, the disclosure of which is incorporated herein by reference.

BACKGROUND OF THE INVENTION

1. Field of the Invention

The present invention relates to a cold-accumulating type air conditioner for a vehicle, provided with a cold accumulator (cold storage unit) cooled by cold air after passing through a cooling heat exchanger. This air conditioner is suitably used for a vehicle that temporarily stops a vehicular engine used as a drive source of a compressor, at time of a stoppage of the vehicle or the like.

2. Description of Related Art

In recent years, as an object to protect the environment, a vehicle (economically running vehicle, hybrid vehicle, or the like) automatically stopping an engine thereof at time of a stoppage of the vehicle such as in waiting for a change of a traffic signal has been practically used, and hereafter, there is a tendency to increase the number of vehicles stopping a vehicle engine thereof at the stoppage of the vehicle.

In an air conditioner for a vehicle, a compressor of a refrigerating cycle is generally driven by a vehicular engine. Therefore, in the economically running vehicle or the like described above, at every stoppages of the engine, the compressor is also stopped. Accordingly, a temperature of a cooling heat exchanger (evaporator) is increased, an air temperature blown into a passenger compartment is increased, and therefore, a cooling feeling for a passenger in the passenger compartment is damaged.

To overcome this problem, a cold-accumulating type air conditioner for a vehicle is provided with a cold accumulator. In this air conditioner, the cold accumulator accumulates cold by a cold air after passing through a cooling heat exchanger while a compressor operates, and air blown into the passenger compartment is cooled by the cold accumulator at a stoppage of the compressor. Accordingly, in this case, characteristics of a cold accumulating material sealed in the cold accumulator become very important, for obtaining a suitable cooling function in the cold accumulator.

SUMMARY OF THE INVENTION

In view of the above-described problems, it is an object of the present invention to provide a vehicle air conditioner with a cold accumulator having a suitable cold-accumulating cooling function.

It is another object of the present invention to improve cold accumulating performance in the cold accumulator by suitably mixing plural paraffin materials having different melting point.

According to the present invention, in a vehicle air conditioner, a cooling heat exchanger is disposed for cooling air blown into a passenger compartment, and a cold accumulator is disposed at a downstream air side of the cooling heat exchanger to be cooled by cold air after passing through the cooling heat exchanger. The cold accumulator has therein a cold accumulating material that is solidified while being cooled by the cold air from the cooling heat exchanger, and the cold accumulating material is a mixture of plural kinds of materials equal to or more than two, having different melting points. In addition, the plural kinds of materials are mixed so that a melting point of the cold accumulating material is in a range of 7–11° C. Generally, the temperature of the cooling heat exchanger is set at about 3° C. for restricting front from being caused. Accordingly, the cold accumulating material can be sufficiently solidified by the cold air from the cooling heat exchanger, and air can be sufficiently cooled by latent heat of fusion of the cold accumulating material in the cold accumulator when the cooling heat exchanger is not operated. Thus, by suitably mixing the plural kinds of material to have the melting point in the range of 7–11° C., comfortable cooling feeling can be given to a passenger in the passenger compartment by using the latent heat of the fusion of the cold accumulating material in the cold accumulator when the cooling heat exchanger is not operated.

Preferably, the cold accumulating material has an addition agent for improving compatibity between the plural kinds of materials. In this case, a partial solidification or a partial melting is not caused, and cold-accumulating cooling function can be effectively improved in the cold accumulator.

Preferably, all the plural kinds of materials are paraffin-type materials. Specifically, the paraffin-type materials are paraffin $C_{14}H_{30}$ and paraffin $C_{16}H_{34}$. Further, the paraffin $C_{14}H_{30}$ and the paraffin $C_{16}H_{34}$ are mixed so that a weight ratio of the paraffin $C_{14}H_{30}$ to the paraffin $C_{16}H_{34}$ is about ⅓. In this case, the melting point of the cold accumulating material is about 8° C., and the cold-accumulating cooling function can be further effectively improved even when the size of the cold accumulator is made smaller.

Further, when the cooling heat exchanger is an evaporator of a refrigerant cycle having a compressor for compressing the refrigerant, while the compressor operates, the operation of the compressor is controlled so that the temperature of an evaporator used as the cooling heat exchanger becomes a target temperature (e.g., 3–5° C.). In this case, the melting point of the cold accumulating material is set higher than the target temperature of the evaporator by a predetermined temperature. Accordingly, cold accumulating quantity of the cold accumulating material in the cold accumulator can be effectively increased, and the cooling function can be maintained by the cold accumulating quantity of the cold accumulating material in the cold accumulator when the compressor is stopped.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

A preferred embodiment of the present invention will be described with reference to the drawings.

Figure 1:
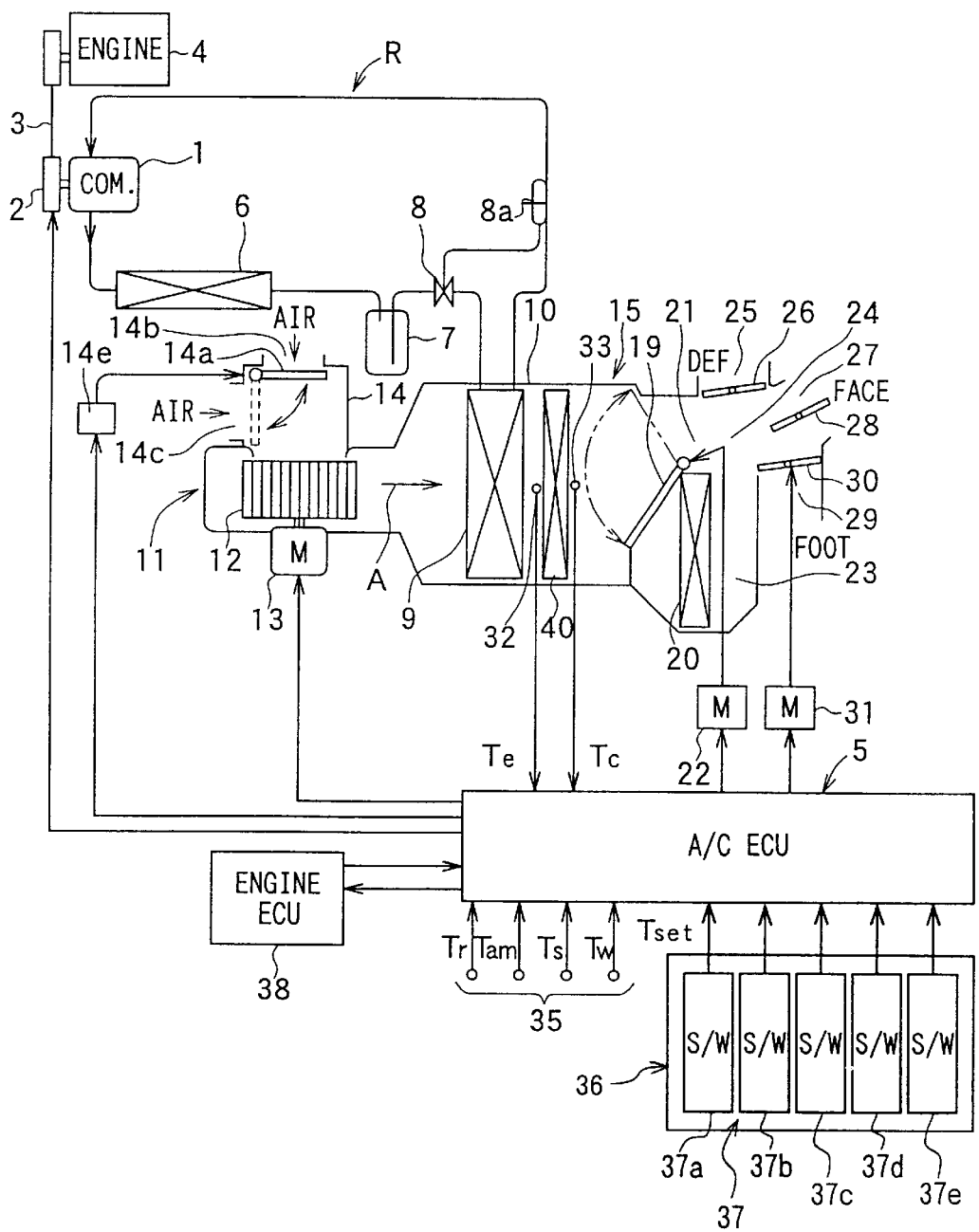
FIG. 1 is a schematic diagram showing an air conditioner according to a preferred embodiment of the present invention.

FIG. 1 is a schematic diagram showing an entire constitution of a vehicle air conditioner according to the embodiment. A refrigerating cycle R of the vehicle air conditioner has a compressor 1 for sucking, compressing, and discharging a refrigerant, and the compressor 1 is provided with an electromagnetic clutch 2 for intermitting power. Since the power from a vehicular engine 4 is transmitted to the compressor 1 via the electromagnetic clutch 2 and a belt 3, an operation of the compressor 1 is intermitted according to an intermission of a current carried to the electromagnetic clutch 2 by an air-conditioning electronic control unit (A/C ECU) 5.

A super-heated gas refrigerant having a high temperature and a high pressure, discharged from the compressor 1, flows into a condenser 6, and is heat-exchanged with outside air blown by a cooling fan (not illustrated) to be cooled and condensed. The refrigerant condensed in the condenser 6, next, flows into a receiver 7, gas and liquid of the refrigerant are separated at an inner section of the receiver 7, and a surplus refrigerant (liquid refrigerant) inside the refrigerating cycle R is stored within the receiver 7.

A liquid refrigerant from the receiver 7 is decompressed by an expansion valve (pressure reducing mean) 8 to become in gas-liquid two phases with a low pressure. The expansion valve 8 is a thermal-type expansion valve having a temperature sensing section 8a for sensing a temperature of an outlet refrigerant of an evaporator (cooling heat exchanger) 9. The low-pressure refrigerant flowing from the expansion valve 8 flows into the evaporator 9. The evaporator 9 is installed inside an air conditioning case 10 of the vehicle air conditioner, the low-pressure refrigerant flowing into the evaporator 9 absorbs heat from air within the air conditioning case 10 and is evaporated. A refrigerant outlet of the evaporator 9 is coupled to a refrigerant suction side of the compressor 1, and a close refrigerant circuit is constructed by the cycle components described above.

In the air conditioning case 10, a blower 11 is disposed at an upstream air side of the evaporator 9, and the blower 11 is provided with a centrifugal type blowing fan 12 and a driving motor 13. At an air suction side of the blowing fan 12, an inside/outside air switching box 14 is arranged. The inside/outside air switching box 14 has an outside air introducing port 14b for introducing outside air outside a passenger compartment, and an inside air introducing port 14c for introducing inside air inside the passenger compartment. The outside air introducing port 14b and the inside air introducing port 14c are opened and closed by an inside/outside air switching door 14a disposed inside the inside/outside air switching box 14. Thereby, outside air or inside air is introduced into the inside/outside air switching box 14. The inside/outside air switching door 14a is driven by an electric drive device 14e composed of a servomotor.

In a ventilating system of the air conditioner, an air conditioning unit 15 is arranged at a downstream air side of the blower 11. Normally, the air conditioning unit 15 is disposed at a central position in a vehicle width direction in an inside of an instrument panel at a front section inside the passenger compartment, and the blower 11 is arranged in an offset position offset to a side of a front passenger' seat from the air conditioning unit 15. A cold accumulator 40 and an air mixing door 19, which will be described later, are sequentially arranged inside the air conditioning case 10 at downstream air sides of the evaporator 9. A hot-water type heater core (heating heat exchanger) 20 for heating air by utilizing hot water (cooling water) from the vehicular engine 4 (E/G) as a heat source is installed downstream the air mixing door 19.

Further, at a sideward part (upward section in FIG. 1) of the hot-water type heater core 20, a bypath passage 21 through which air (cold air) from the evaporator 9 flows while bypassing the hot-water type heater core 20 is formed. The air mixing door 19 is rotatable door formed into a plate shape, and is driven by an electric drive device 22 composed of a servomotor.

The air mixing door 19 is a door for adjusting an air flow ratio between hot air passing through the hot-water type heater core 20 and cold air passing through the bypath passage 21, and adjusts an air temperature blown into the passenger compartment by adjusting the air flow ratio between cold air and hot air. In the present embodiment, the air mixing door 19 constructs temperature adjusting mean of air blown into the passenger compartment. A hot air passage 23 extending upward from a bottom side is formed downstream the hot-water type heater core 20. Accordingly, air having a desirable temperature can be obtained by mixing hot air from the hot air passage 23 and cold air from the bypath passage 21 in an air mixing section 24.

Further, inside the air conditioning case 10, an air outlet mode switching portion is constructed at a downstream side of the air mixing section 24. That is, a defroster opening section 25 is formed on an upper surface section of the air conditioning case 10, and the defroster opening section 25 is provided for blowing air toward an inner surface of a windshield of a vehicle via a defroster duct (not illustrated). The defroster opening section 25 is opened and closed by a freely rotatable defroster door 26 formed into a plate like.

Further, in the upper surface section of the air conditioning case 10, at a portion on a vehicle rear side from the defroster opening section 25, a face opening section 27 is formed, and the face opening section 27 is provided for blowing air toward the upper half of a passenger within the passenger compartment via a face duct (not illustrated). The face opening section 27 is opened and closed by a freely rotatable face door 28 formed into a plate like.

Further, in the air conditioning case 10, a foot opening section 29 is formed at a lower side portion of the face opening section 27, and the foot opening section 29 is provided for blowing air toward the foot area of a passenger inside the passenger compartment. The foot opening section 29 is opened and closed by a freely rotatable foot door 30 formed into a plate like. The air outlet mode doors 26, 28, and 30 described above are connected to a common link mechanism (not illustrated), and are driven by an electric drive device 31 composed of a servomotor via the link mechanism.

An evaporator temperature sensor 32 is disposed at a portion directly after an air outlet of the evaporator 9 inside the air conditioning case 10, and detects an evaporator air temperature Te after immediately passing through the evaporator 9. Further, a cold accumulator temperature sensor 33 is arranged at a portion directly after an air outlet of the cold accumulator 40, and detects a cold accumulator air temperature Tc after immediately passing through the cold accumulator 40.

Here, the evaporator air temperature Te detected by the evaporator temperature sensor 32 is utilized for the intermission control of the electromagnetic clutch 2 of the compressor 1. Further, in a case where the compressor 1 is of a variable displacement type, the evaporator air temperature Te is utilized for a control of a discharge displacement of the compressor 1. Further, the cooling capability of the evaporator 9 is adjusted by these clutch intermission control or the control of the discharge displacement of the compressor 1. On the other hand, the cold accumulator air temperature Tc detected by the cold accumulator temperature sensor 33 is utilized for the control of an opening degree of the air mixing door 19 so that the opening degree of the air mixing door 19 is controlled by the cold accumulator air temperature Tc.

In the air-conditioning electronic control unit 5 (A/C ECU), detection signals are inputted from both the temperature sensors 32 and 33 described above, and from a well known sensor group 35 for detecting an inside air temperature Tr, an outside air temperature Tam, an amount of solar radiation Ts, and a hot water temperature Tw and the like for the purpose of air conditioning control. Further, onto an air conditioning control panel 36 installed in the neighborhood of the instrument panel inside the passenger compartment, an operation switch group 37 manually operated by a passenger is provided. Operation signals from these operation switch group 37 are also inputted to the air-conditioning electronic control unit 5.

The operation switch group 37 includes a temperature setting switch 37a for generating a temperature setting signal Tset, an air volume switch 37b for generating an air volume switching signal, an air outlet mode switch 37c for generating an air outlet mode signal, an inside/outside air changeover switch 37d for generating an inside/outside air switching signal, an air conditioning switch 37e for generating an on/off signal of the compressor 1, and the like. By a manual operation of the air outlet mode switch 37c, an air outlet mode is set among a face mode, a foot mode, a bi-level mode, a foot/defroster mode, and a defroster mode.

Further, the A/C electronic control unit 5 is connected to an engine electronic control unit 38 (an engine ECU). Accordingly, from the engine electronic control unit 38 to the air-conditioning electronic control unit 5, a revolutionary speed signal of the vehicular engine 4, a vehicular speed signal, and the like are inputted.

The engine electronic control unit 38 is for synthetically controlling a fuel injection amount and an ignition timing in the vehicular engine 4 on the basis of signals from a sensor group (not illustrated) for detecting an operation state or the like of the vehicular engine 4. Further, in an economically running vehicle or a hybrid vehicle, when a vehicular stoppage state is determined on the basis of a revolutionary speed signal of the vehicular engine 4, a vehicular speed signal, a brake signal or the like, the engine electronic control unit 38 automatically stops a vehicular engine 4 by a cutoff of an electronic source of an ignition device, a stoppage of fuel injection or the like.

Further, after a stoppage of the vehicle engine 4, when the vehicle is shifted from a vehicular stoppage state to a start state by an operation of a driver, the engine electronic control unit 38 determines the start state of the vehicle on the basis of an acceleration signal or the like, and automatically starts the vehicular engine 4. In addition, the air-conditioning electronic control unit 5 outputs an engine re-operation signal based on an increase of the cold accumulator air temperature Tc or the like, after the stoppage of the vehicular engine 4.

The air-conditioning electronic control unit 5 and the engine electronic control unit 38 are constructed of a well known microcomputer composed of a CPU, a ROM, a RAM, or the like, and their peripheral circuit. The air-conditioning electronic control unit 5 has an engine control signal output section for outputting signals of stop permission or stop prohibition of the vehicular engine 4 or a signal of the engine re-operation after the stoppage thereof, a compressor intermission control section due to the electromagnetic clutch 2, an inside/outside air sucking control section due to the inside/outside air switching door 14a, an air volume control section of the blower 11, a temperature control section due to the air mixing door 19, an air outlet mode control section due to switching of blow outlets 25, 27, and 29, and the like.

Next, the structure of the cold accumulator 40 will be now described in detail. The cold accumulator 40 is formed to have the same front surface area as that of the evaporator 9 as being illustrated in FIG. 1, so that entire volume (entire volume of air flowing inside air conditioning case 10) of cold air after passing through the evaporator 9 passes through the cold accumulator 40. In this embodiment, the cold accumulator 40 is constructed to have a thin thickness in an air flow direction A, inside the air conditioning case 10.

The cold accumulator 40 is constructed by plural tubes made of a metal such as aluminum having a sufficient heat-transmitting performance. Within the tubes of the cold accumulator 40, a cold accumulating material is sealed. The tubes of the cold accumulator 40 are arranged to have a predetermined clearance between adjacent two tubes, so that air passes through the clearance between the adjacent two tubes.

Each of the tubes in the cold accumulator 40 can be formed by bonding two heat-transmitting plates using a brazing material, or can be formed integrally by extrusion. Further, corrugated fins can be disposed between the adjacent tubes so that heat-transmitting performance on the air side can be improved.

Next, operation of the vehicle air conditioner according to this embodiment will be explained. In the vehicle air conditioner, the refrigerating cycle R is operated by driving the compressor 1 by the vehicular engine 4, and a temperature of the evaporator 9 is maintained at a temperature in the vicinity of 3° C.–5° C. by the intermission control of the operation of the compressor 1, so that the evaporator 9 is prevented from being frosted.

In the evaporator 9, refrigerant with a low temperature and a low pressure decompressed by the expansion valve 8 absorbs heat from air blown by the blower 11 and is evaporated, so that air is cooled in the evaporator 9 and air blown from the evaporator 9 becomes cold air. Cold air from the evaporator 9, next, passes through the air passages formed between the tubes of the cold accumulator 40. As a result, the cold accumulating material within the cold accumulator 40 is cooled and solidified from a liquid phase state in a normal room temperature to a solid phase, and cold accumulation can be performed in the configuration of latent heat of fusion (melting latent heat).

Thus, in an economically running vehicle that automatically stops the engine 4 in the stoppage of the vehicle (when no engine power is required), such as in waiting for a change of a traffic signal, even if the compressor 1 of the refrigerating cycle R becomes the stoppage state at the time of stoppage of the vehicle, the air temperature blown into the passenger compartment can be maintained comparatively in a low temperature state by utilizing a cold accumulating amount of the cold accumulating material. Accordingly, during a cooling operation in a summer period, an abrupt increase in the air temperature blown into the passenger compartment, due to the stoppage of the compressor 1, can be restrained, and worsening of a cooling feeling for a passenger in the passenger compartment can be prevented.

When the compressor 1 (vehicle engine 4) operates, the cold accumulating material in the cold accumulator 40 is cooled and solidified by cold air after passing through the evaporator 9, and cold accumulation of the cold accumulating material is performed by the latent heat of fusion. On the other hand, when the compressor 1 (vehicle engine 4) stops, air blown into the passenger compartment is cooled by the accumulated cold amount due to the latent heat of fusion, so that cooling function for cooling the passenger compartment can be obtained. Thus, it is necessary to set the melting point of the cold accumulating material to be higher than the temperature of the cold air from the evaporator 9. However, when the melting point of the cold accumulating material is excessively high, the temperature of air blown into the passenger compartment becomes higher when the air is cooled by the accumulated cold amount of the cold accumulating material while the compressor 1 stops. Accordingly, in this case, insufficient cooling is obtained. In this embodiment, it is preferable to set the melting point of the cold accumulating material in a range of 7–11° C. It is more preferable to set the melting point of the cold accumulating material at about 8° C.

Generally, the temperature of the evaporator 9 is controlled in a range of 3–5° C. in order to prevent a frosting in the evaporator 9. Thus, when the melting point of the cold accumulating material is about 8° C., a predetermined temperature difference between the melting point of the cold accumulating material and the temperature of the evaporator 9 can be maintained, and the cold accumulating material can be effectively solidified using the cold air after passing through the evaporator 9. Further, when the melting point (freezing point) is about 8° C., the air blown into the passenger compartment can be cooled by the cold accumulator 40 to a temperature about 10° C. that is slightly higher than the melting point, when the compressor 1 stops. Thus, sufficient cooling performance can be obtained by only using the cold accumulator 40.

Further, in order to reduce the size of the cold accumulator 40, it is required to increase the latent heat of fusion in per unit of the cold accumulating material and to increase the density of the cold accumulating material.

The inventors of the present invention, the cold accumulating material used for the cold accumulator 40 is studied based on the melting point (freezing point), the latent heat of fusion, a material cost, and corrosion relative to aluminum material and the like. Further, a thermodynamic quantity of the cold accumulating material using the phase change (latent heat) in the cold accumulator 40 is measured by Differential Scanning Calorimetry (hereinafter referred to as "DSC"). In the DSC, a sample and a reference material are disposed respectively within independent cells, and are thermal-increased or thermal decreased at the same time by a constant speed. At this time, Joule heat supplied from an outside for maintaining the temperature of the sample and the reference material at the same temperature is measured. Hear, the joule heat is the reaction heat of the sample in a scanning temperature range.

Figures 2, 3:
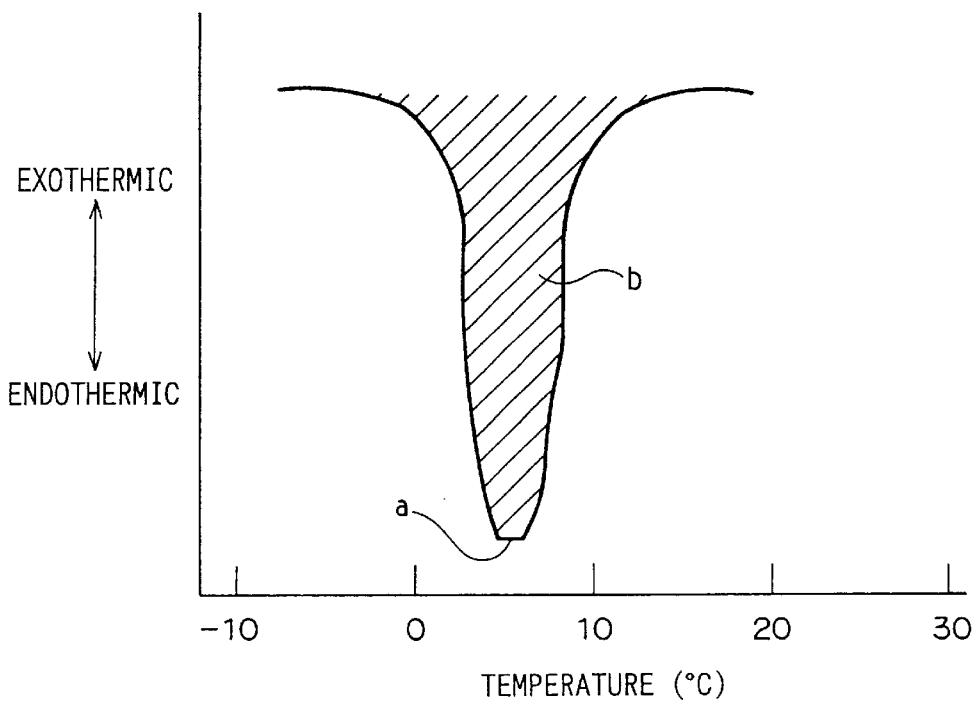
FIG. 2 is a graph showing a measured result of a paraffin ($C_{14}H_{30}$) in a Differential Scanning Calorimetry (DSC)
FIG. 3 is a view showing a melting point and a melting latent heat in various paraffin materials.

FIG. 2 shows a graph of the DSC of paraffin $C_{14}H_{30}$ (i.e., n-tetradecane) that is generally used as the cold accumulating material. In FIG. 2, the abscissa is the temperature of the paraffin $C_{14}H_{30}$, and the ordinate indicates the Joule heat supplied from the outside. Further, an endothermic peak of the melting of the paraffin $C_{14}H_{30}$ is indicated by the "a" point in FIG. 2, and the melting latent heat can be determined by the area of the endothermic peak, shown by the tilt line "b" in FIG. 2.

As shown in FIG. 3, the melting point (freezing point) of the paraffin $C_{14}H_{30}$ is 5.9° C., and has a small temperature difference with the above-described temperature (3–5° C.) of the evaporator 9. Therefore, the paraffin $C_{14}H_{30}$ cannot be sufficiently cooled by the cold air from the evaporator 9 when the temperature of the evaporator 9 is set in a range 3–5° C. Thus, when the paraffin $C_{14}H_{30}$ is used as the cold accumulating material, all the cold accumulating material in the cold accumulator 40 cannot be uniformly solidified, and a necessary cold accumulating quantity cannot be obtained when the size of the cold accumulator 40 is made small.

FIG. 3 shows the melting point and the melting latent heat of a paraffin-type cold accumulating material. As shown in FIG. 3, as the molecule number of carbon increases in the paraffin-type cold accumulating material, the melting point of the paraffin-type cold accumulating material increases. The melting point of the paraffin $C_{12}H_{26}$ is too low, and the melting point of the paraffin $C_{16}H_{34}$ and the paraffin $C_{18}H_{38}$ is too high. Therefore, the paraffin $C_{12}H_{26}$, the paraffin $C_{16}H_{34}$ and the paraffin $C_{18}H_{38}$ cannot be effectively used for the cold accumulating material of the cold accumulator 40 in the vehicle air conditioner.

Figure 4:
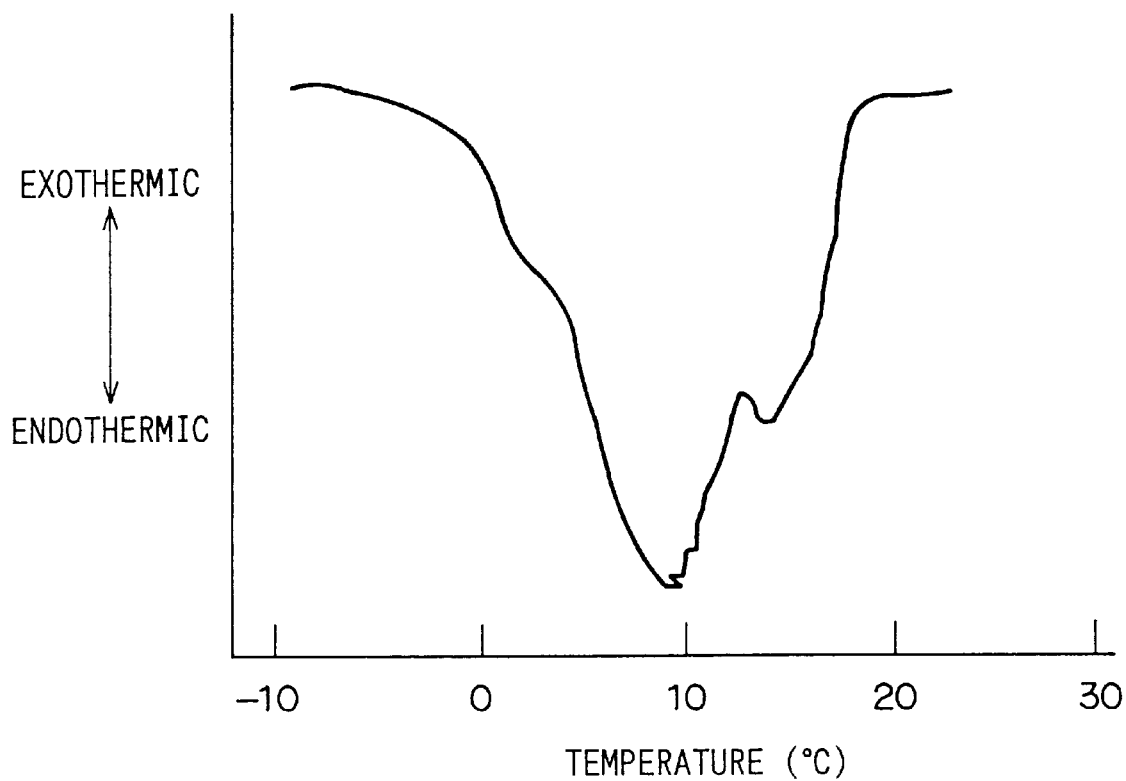
FIG. 4 is a graph showing a measured result of DSC of a cold accumulating material according to the preferred embodiment.

In this embodiment, a cold accumulating material to be suitably used for the cold accumulator 40 in the vehicle air conditioner is obtained by mixing a material having a low melting point and a material having a high melting point. Specifically, the paraffin $C_{14}H_{30}$ and the paraffin $C_{16}H_{34}$ are mixed. That is, by mixing the paraffin $C_{14}H_{30}$ having the low melting point and the paraffin $C_{16}H_{34}$ having the high melting point, a cold accumulating material having a middle melting point between the paraffin $C_{14}H_{30}$ and the paraffin $C_{16}H_{34}$ can be readily obtained. As an example, the paraffin $C_{14}H_{30}$ and the paraffin $C_{16}H_{34}$ are mixed so that a weight ratio (mixing ratio) of the paraffin $C_{14}H_{30}$ to the paraffin $C_{16}H_{34}$ is 1/3. FIG. 4 shows the DSC of the mixed paraffin material at this mixing ratio. As shown in FIG. 4, the endothermic peak point of the mixed paraffin material is at a middle point between the melting point of the paraffin $C_{14}H_{30}$ and the melting point of the paraffin $C_{16}H_{34}$, and the melting point thereof is about 8° C. The mixed paraffin material having the melting point about 8° C. is suitable used as the cold accumulating material of the vehicle air conditioner.

When the mixed paraffin is sealed in the cold accumulator 40 as the cold accumulating material, the cold accumulating material can be sufficiently solidified by the cold air after passing through the evaporator 9, and a necessary cold accumulating quantity can be readily obtained. Further, because the melting point (freezing point) of the cold accumulating material is about 8° C., air to be blown into the passenger compartment can be cooled to a temperature about 10° C. slightly higher than the melting point of 8° C. when the compressor 1 stops. Accordingly, comfortable cooling feeling can be given to the passenger in the passenger compartment even when the compressor 1 stops.

When the compatibity between the paraffin $C_{14}H_{30}$ and the paraffin $C_{16}H_{34}$ is insufficient in the mixed paraffin used as the cold accumulating material, the freezing or the melting may be partially caused relative to a temperature change of the cold accumulator 40 in the mixed paraffin. Therefore, an addition agent for improving the compatibity between different cold accumulating materials can be used. For example, as the addition agent, a mineral oil can be used.

According to the experiments by the inventors of the present invention, when the melting point of the mixed cold accumulating material is in a range of 7–11° C., air to be blown into the passenger compartment can be effectively cooled in the cold accumulator 40 while the compressor 1 stops. Accordingly, by mixing plural kinds of the paraffin materials to have the melting point in the range of 7–11° C., a mixed cold accumulating material suitable used in the cold accumulator 40 can be obtained. That is, when the mixed cold accumulating material has the melting point in the range 7–11° C., the mixed cold accumulating material can be readily frozen by the cold air from the evaporator 9, while air blown into the passenger compartment can be sufficiently cooled in the cold accumulator 40 while the compressor 1 stops.

Although the present invention has been fully described in connection with the preferred embodiment thereof with reference to the accompanying drawings, it is to be noted that various changes and modifications will become apparent to those skilled in the art.

For example, in the above-described embodiment of the present invention, two kinds of paraffin materials having different melting points are mixed. However, plural kinds of paraffin materials having different melting points, more than two, can be mixed.

Further, plural cold accumulating materials different from the paraffin can be mixed to have the suitable mailing point.

Such changes and modifications are to be understood as being within the scope of the present invention as defined by the appended claims.

What is claimed is:

1. An air conditioner for a vehicle having a passenger compartment, comprising:
   a cooling heat exchanger for cooling air blown into a passenger compartment;
   a cold accumulator disposed at a downstream air side of the cooling heat exchanger, the cold accumulator being cooled directly by cold air after passing through the cooling heat exchanger, wherein:
     the cold accumulator has therein a cold accumulating material that is solidified while being cooled by the cold air from the cooling heat exchanger;
     the cold accumulating material is a mixture of plural kinds of materials equal to or more than two, having different melting points;
     the plural kinds of materials are mixed so that a melting point of the cold accumulating material is in a range of 7–11° C;
     all the plural kinds of materials are paraffin-type materials;
     the paraffin-type materials are paraffin $C_{14}H_{30}$ and paraffin $C_{16}H_{34}$; and
     in the cold accumulating material, a weight ratio of the paraffin $C_{14}H_{30}$ to the paraffin $C_{16}H_{34}$ is about ⅓.

2. The air conditioner according to claim 1, wherein:
   the cold accumulating material has an addition agent for improving compatibility between the plural kinds of materials.

3. The air conditioner according to claim 1, further comprising:
   a compressor driven by an engine for running the vehicle, the engine being stopped while an engine power is unnecessary in the vehicle, the compressor being for compressing refrigerant in a refrigerant cycle system;
   a temperature detection device that detects temperature of the cooling heat exchanger; and
   a control unit for controlling operation of the compressor, wherein:
     the cooling heat exchanger is an evaporator of the refrigerant cycle;
     the control unit controls the operation of the compressor so that the temperature of the evaporator becomes a target temperature; and
     the melting point of the cold accumulating material is higher than the target temperature by a predetermined temperature.

4. The air conditioner according to claim 1, wherein:
   the cooling heat exchanger is an evaporator of a refrigerant cycle; and
   the cold accumulator is disposed opposite to the evaporator to be separated from the evaporator by a predetermined space.

5. The air conditioner according to claim 4, further comprising:
   a control unit that controls the temperature of air directly blown from the evaporator to a temperature approximately in a range of 3–5° C. when the refrigerant cycle operates.

6. The air conditioner according to claim 5, wherein the cold accumulator cools air to be blown into the passenger compartment when operation of the refrigerant cycle is stopped.

7. The air conditioner according to claim 1, wherein the cold accumulating material is sealed in the cold accumulator.

8. A cold accumulating material sealed in a cold accumulator that is cooled directly by cold air after passing through a cooling heat exchanger of a vehicle air conditioner,
   the cold accumulating material being composed of at least a mixture of plural kinds of paraffin materials having different melting points, wherein:
     the plural kinds of paraffin materials equal to or more than two are mixed to have a melting point in a range of 7–11° C.
     the cold accumulating material is a mixture of paraffin $C_{14}H_{30}$ and paraffin $C_{16}H_{34}$ wherein a weight ratio of the paraffin $C_{14}H_{30}$ to the paraffin $C_{16}H_{34}$ is about ⅓.

9. The cold accumulating material according to claim 8, wherein the cold accumulating material is solidified by the cold air having a temperature approximately in a range of 3–5° C., from the cooling heat exchanger.

* * * * *